(12) United States Patent
Martinisko

(10) Patent No.: US 9,995,027 B2
(45) Date of Patent: Jun. 12, 2018

(54) DISPOSABLE SPLASH SHIELD FOR USE WHEN PLUNGING A TOILET

(71) Applicant: Robert S. Martinisko, Clifton, VA (US)

(72) Inventor: Robert S. Martinisko, Clifton, VA (US)

(*) Notice: Subject to any disclaimer, the term of this patent is extended or adjusted under 35 U.S.C. 154(b) by 412 days.

(21) Appl. No.: 14/538,215

(22) Filed: Nov. 11, 2014

(65) Prior Publication Data
US 2015/0060313 A1    Mar. 5, 2015

Related U.S. Application Data

(63) Continuation-in-part of application No. 13/163,812, filed on Jun. 20, 2011.

(51) Int. Cl.
*E03D 9/00* (2006.01)
*B65D 75/58* (2006.01)

(52) U.S. Cl.
CPC ............ *E03D 9/00* (2013.01); *B65D 75/5805* (2013.01); *Y02W 90/13* (2015.05)

(58) Field of Classification Search
CPC ........................................................ E03D 9/11
USPC ........................................................ 4/300.3
See application file for complete search history.

(56) References Cited

U.S. PATENT DOCUMENTS

| | | | | |
|---|---|---|---|---|
| 3,208,092 A | * | 9/1965 | O'Leary | 4/253 |
| 3,477,070 A | * | 11/1969 | Kimber | 4/253 |
| 4,458,368 A | * | 7/1984 | Webb | 4/300.3 |
| 4,922,555 A | * | 5/1990 | Bonilla et al. | 4/300.3 |
| 5,706,528 A | * | 1/1998 | Broback | 4/253 |
| 5,860,170 A | * | 1/1999 | Witt | 4/300.3 |
| 6,035,456 A | * | 3/2000 | Taylor | 4/255.11 |
| 6,804,838 B2 | * | 10/2004 | Lacus | 4/300.3 |

* cited by examiner

*Primary Examiner* — Tuan N Nguyen
(74) *Attorney, Agent, or Firm* — Dennis H. Lambert

(57) ABSTRACT

A transparent, biodegradable, disposable splash shield sized to fit on a toilet bowl rim to prevent splashing of water from the bowl when a plunger is used to free an obstruction in the toilet. The shield is dome shaped and has an upstanding projection on its top that can be gripped to pull the shield from the plunger handle following use. An annular flange on the bottom end of the shield is adapted to rest on rim of a toilet bowl. Adhesive material on the underside of the flange, or strips of adhesive tape on the marginal edge of the shield, releasably secure the shield in position. The shield is nestable and may be foldable in half. A toilet kit includes the splash shield, gloves, at least one paper towel, and a flattened box, all packaged in an envelope-like bag that can be used to contain and dispose of these items following use.

18 Claims, 8 Drawing Sheets

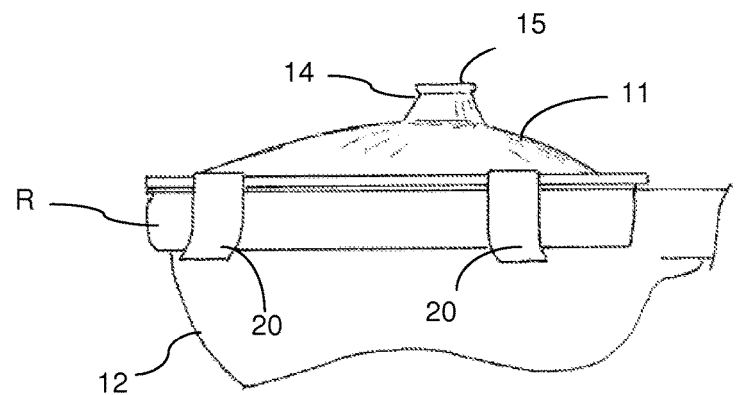
FIG. 7
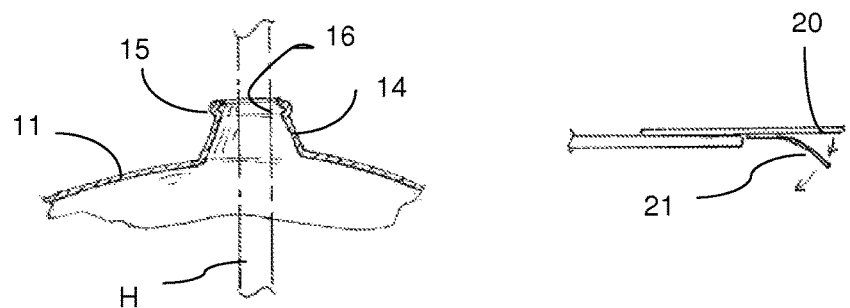
FIG. 8
FIG. 9

DISPOSABLE SPLASH SHIELD FOR USE WHEN PLUNGING A TOILET

This application is a continuation-in-part of application Ser. No. 13/163,812, filed Jun. 20, 2011.

TECHNICAL FIELD OF THE INVENTION

This invention relates to apparatus for use in plunging flush toilets, and particularly to a splash shield for preventing splashing of water out of a toilet when a plunger is being used to unclog the toilet.

BACKGROUND ART

Residential and commercial toilets dispose of human waste by using water to flush it through a drainpipe to another location. Most modern flush toilets incorporate an 'S' bend or trap that normally remains filled with water to create a water seal that prevents flow of noxious gases back through the toilet. The trap also provides a siphon action that helps accelerate the flushing process. When the toilet is flushed, water fills up the bowl and creates a high pressure area that forces the water past the trap. If the trap should become obstructed, the toilet can overflow when it is flushed. A plunger typically is used to remove the obstruction, but its use can result in splashing of water and other material from the toilet.

Several devices have been developed in the prior art to prevent splashing of water from the toilet when a plunger is being used to remove an obstruction from the toilet. Exemplary of such devices are those shown in U.S. Pat. Nos. 4,458,368, 4,831,669, 4,922,555, 5,706,528, 5,860,170, 6,487,730, 6,594,831 and 7,134,450. These devices are either intended for re-use and are relatively expensive and complex in construction, and/or are difficult to use.

Applicant's copending US patent application, published under Publication Number 2010/0000010, provides a see-through splash shield and kit, wherein the shield is inexpensive and easy to use and is disposable following use. However, the shield is flat and provides minimal clearance for movement of water during use. Moreover, it fits closely around the plunger handle extending through it, increasing the risk that use of the plunger will dislodge the shield from the rim of the toilet bowl.

Applicant's copending U.S. patent application Ser. No. 13/163,812 improves the splash shield disclosed in 2010/0000010 by giving the shield an upward dome shape and putting the opening through which the plunger handle extends in an upwardly extending projecting on top of the shield. It also provides a gripping means on the upper end of the projection that can be gripped to pull the shield from the plunger handle without the user having to touch or handle the soiled underside of the shield following its use. However, the means for securing the shield to the rim of the toilet bowl is relatively expensive and may not be readily adapted to different size toilet bowl rims.

DISCLOSURE OF THE INVENTION

According to one aspect of the invention, a simple, inexpensive, easy to use, disposable splash shield is provided to prevent splashing of water from a toilet when a plunger is being used to remove an obstruction from the toilet. The splash shield of the invention comprises a transparent dome shaped shield body having a radially outwardly extending annular flange on its bottom marginal edge adapted to rest on the rim of a toilet bowl, and an upwardly extending projection on its top end with an opening formed through it for receiving the handle of the plunger so that the plunger can be reciprocated relative to the shield without moving the shield away from the rim. The upstanding projection and opening are positioned in the shield body so that they are in substantial alignment with a drain opening from the toilet bowl when the splash shield is in use and is correctly positioned on the rim of a toilet bowl. The opening permits tilting movement of the plunger handle in multiple directions relative to the shield, and the projection can be grasped by the user to pull the shield from the plunger handle following use. Seal means affixed to the bottom surface of the flange seals the flange to the toilet bowl rim.

The shield has sufficient thickness and rigidity to maintain its shape, and releasable adhesive means preferably is carried by the shield for releasably securing the shield in place on a toilet bowl during use of the shield. The releasable adhesive means may comprise an adhesive material applied to the underside of the flange or the seal means, whereby the marginal edge portion of the shield merely needs to be pressed downwardly against the rim of the toilet bowl, or strips of tape may be affixed to the annular flange so that the tape can be folded downwardly and pressed against the upper outer surface of the toilet bowl. Alternatively, the releasable adhesive means may comprise both the strips of tape and the adhesive material applied to the underside of the annular flange or seal means.

In a first embodiment the upstanding projection is conically shaped and the opening through its upper end loosely receives the toilet plunger handle. An annular bead on the outside of the upper end of the projection forms a gripping surface to enhance the grip of a person using the shield to facilitate pulling the shield from the plunger handle following use.

In another embodiment a relatively large opening is formed through the top of the dome shaped shield body and a flexible membrane is secured in that opening. The membrane comprises the upwardly extending projection, and the opening for receiving the plunger handle is formed in the flexible membrane In a preferred embodiment, the upwardly extending projection is generally X-shaped in plan view and has sufficient rigidity to form a handle that can be gripped to pull the shield from the plunger handle following use of the shield. In this embodiment, the opening for receiving the handle of a plunger comprises an elongate slot extending fore and aft in the top end of the upwardly extending projection.

In an alternate embodiment, the slot for receiving the plunger handle is generally X-shaped in plan view so that it extends both fore and aft and side-to-side.

In a still further preferred embodiment the seal means comprises a thin layer of paper material adhesively secured to the bottom surface of the annular flange. In a preferred construction the paper material comprises thin corrugated cardboard. Alternatively, the seal means may be made of a sponge-like foam material.

In another preferred embodiment, only the upwardly curved dome of the shield and the upwardly extending projection are made of a transparent plastic material, and the annular flange is made of a separate piece of paper material having a relatively narrow upstanding inner marginal edge that is secured to the bottom edge portion of the dome. The paper material forms a seal with the toilet bowl rim without having to use a separate seal means.

The shield is nestable with like shields for compact packaging and storage, and in a further preferred embodiment the shield is foldable so that it can be folded into a smaller configuration for shipping, storage and disposal.

According to another aspect of the invention, a kit is provided that includes the splash shield, a pair of latex or nitrile rubber gloves, a box for transporting a plunger to a location to be cleaned after it has been used, and optionally one or more paper towels. The shield, gloves, box and paper towels preferably are packaged together in an envelope-like bag that can be used to dispose of these items following their use. If desired, an inexpensive disposable plunger can be a part of the package.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein:

FIG. 7 is a fragmentary side view in elevation of the splash shield of FIG. 4, shown in place on the rim of a toilet bowl.

FIG. 8 is an enlarged fragmentary sectional view of an upper portion of the shields of FIGS. 1-7, showing the construction of a first form of upwardly extending projection and associated opening means for receiving the plunger handle.

FIG. 9 is an enlarged fragmentary sectional view taken along line 9-9 in FIG. 4, showing the protective peel-away strip being removed from the adhesive side on one of the strips of adhesive tape.

BEST MODES FOR CARRYING OUT THE INVENTION

Figure 1:
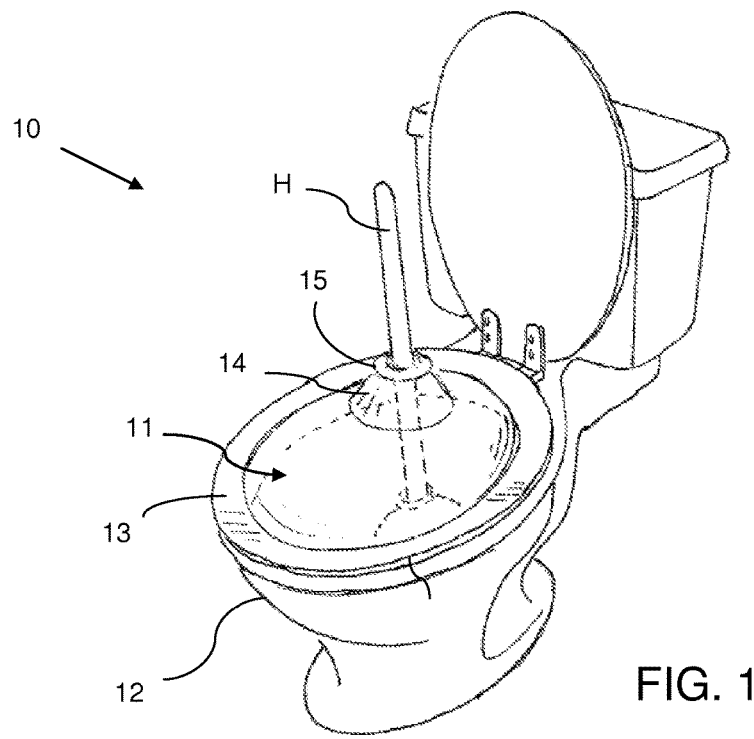
FIG. 1 is a top perspective view of an elongated toilet bowl with a transparent plastic splash shield according to a first form of the invention in place over the toilet bowl rim and a plunger in operative position below the shield, with the handle of the plunger received through the opening in the shield.

A first form of splash shield according to the invention is indicated generally at 10 in FIGS. 1-5. In this form of the invention the shield body 11 is made of a biodegradable transparent plastic material having sufficient thickness and rigidity to maintain its shape when being used, and has an elongated shape to conform to the shape of the rim of an elongated toilet bowl 12. The thickness and rigidity of the shield may be similar to that of a plastic water bottle, i.e. having a thickness on the order of about 0.010 inch, and the biodegradable material may comprise the same material used in the BioGreen water bottles made by California Springs Water Bottles. That material is a low density polyethylene with an additive California Springs Water Bottles calls Bio-Batch. This material helps the bottles biodegrade in an active microbial environment which is present in landfills and compost facilities.

In the first form of the invention the shield body 11 is dome shaped with a radially outwardly extending flat annular flange 13 on its bottom edge and an upwardly extending projection 14 on its top end that has an opening O through it to slidably receive the handle H of a plunger P. The projection 14 and opening O are in a position to be in approximate alignment with the drain opening from the toilet bowl when the shield is in operative position. The projection forms a gripping means that is grasped to pull the shield from the plunger handle following use. As seen best in FIG. 8, the upper end of the gripping means 14 is first turned outwardly to form an annular outwardly projection bead 15, and then turned inwardly to form an inwardly directed lip 16 that closely surrounds the handle H of a plunger P. The bead 15 helps keep the fingers of the user from slipping off the gripping means, and the lip 16 helps prevent splashing of water past the handle where it extends through the opening O. As depicted in FIG. 8, some clearance is provided between the inwardly turned lip 16 and the plunger handle to prevent inadvertent dislodgement of the shield during use of the plunger.

Seal means 17 is provided on the bottom surface of the flange 13 to mate with the rim of the toilet bowl and form a seal between the shield and the toilet bowl. As shown in this form of the invention, the seal means may comprise a gasket seal formed of any suitable material that will absorb water and prevent it from leaking past the margin of the shield. A suitable example would be a sponge-like foam material as shown at 17A in FIG. 5, or cardboard as shown at 17B in FIG. 6.

Figure 2:
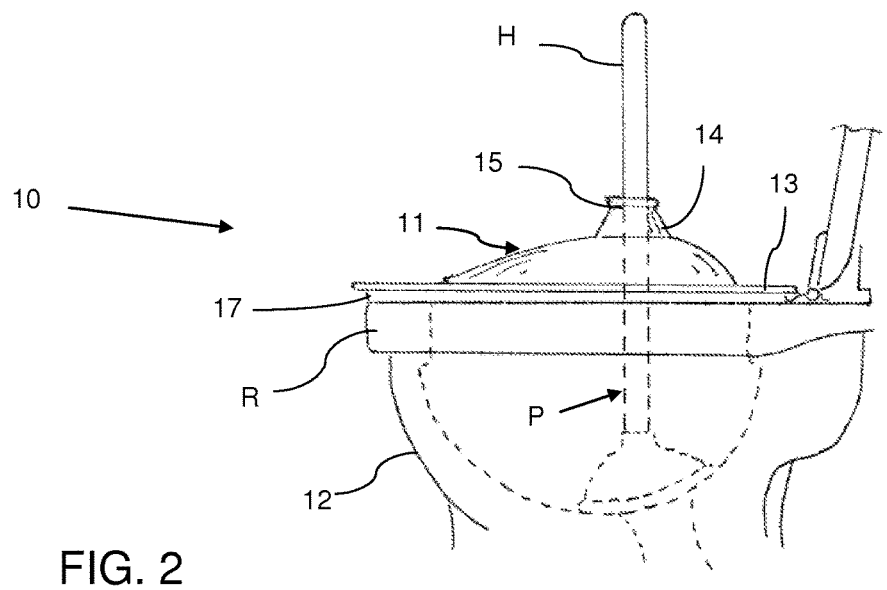
FIG. 2 is a slightly enlarged fragmentary side view in elevation of the toilet bowl and shield of FIG. 1.
Figure 3:
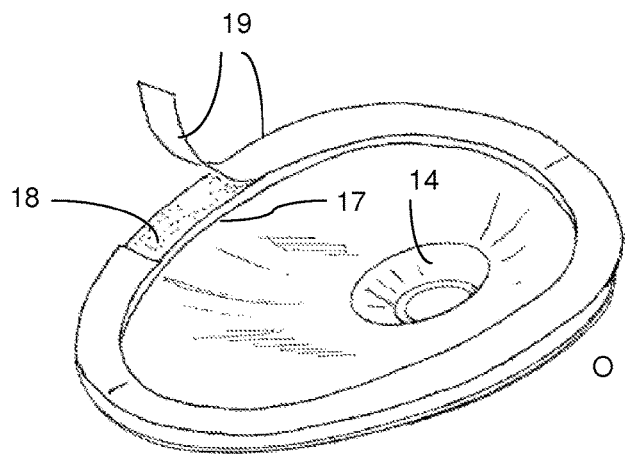
FIG. 3 is a bottom perspective view of the shield of FIG. 1, showing the protective peel-away strip being removed from the adhesive surface of the gasket seal.
Figures 5, 6:
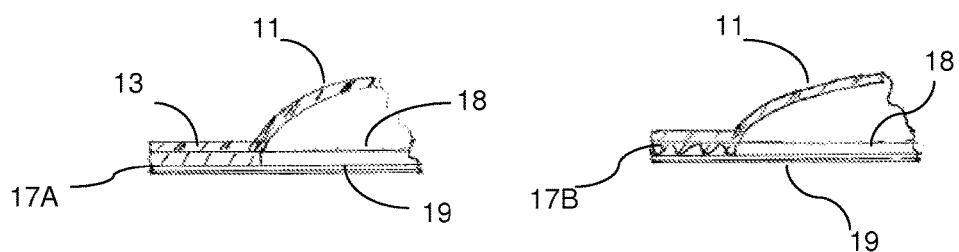
FIG. 5 is an enlarged fragmentary sectional view taken along line 5-5 in FIG. 4, wherein the gasket seal comprises a sponge-like foam material.
FIG. 6 is an enlarged fragmentary sectional view similar to FIG. 5, but showing an embodiment wherein the gasket shield is made of cardboard.

In the embodiment shown in FIGS. 1-3 the underside of the gasket seal 17 has an adhesive 18 applied to it, either in the form of double sided tape or a coating of adhesive on the gasket seal. In either case, a protective peel-away strip 19 of paper or other material known in the art for this purpose preferably is applied to the adhesive to prevent it from adhering to something until ready for use. The peel-away strip is then removed, as depicted in FIG. 3, which shows the shield upside down for purpose of illustration, and the marginal edge of the shield with the exposed adhesive on its underside is pressed downwardly against the rim R of toilet bowl 12 to attach and seal the shield to the toilet bowl.

As seen best in FIG. 2, the marginal edge 13 of the shield 11 could project slightly beyond the outer surface of the toilet bowl to provide an edge under which the fingers can be placed to facilitate lifting of the shield from the bowl when desired.

Figure 4:
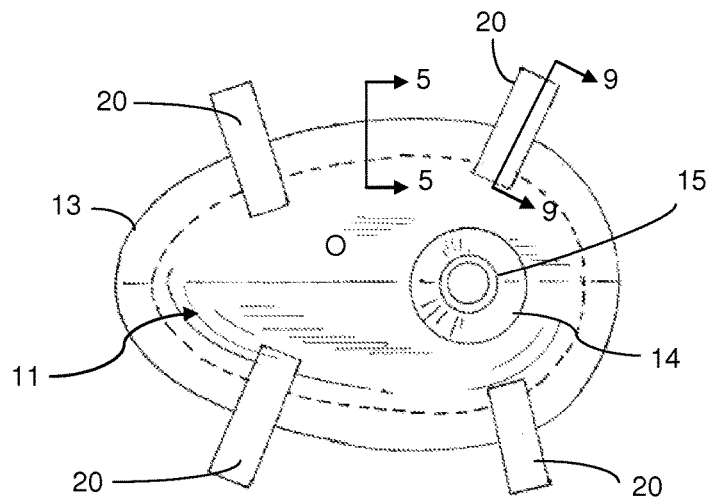
FIG. 4 is a top plan view of the an alternative embodiment of the shield of FIG. 1, wherein strips of tape are used in place of or in addition to the adhesive surface of FIGS. 1 and 3.

In a preferred embodiment shown in FIGS. 4, 7 and 9, strips of adhesive tape 20 are spaced around the periphery of the shield for use in attaching the shield to the rim of a toilet bowl. Four such strips of tape are shown in FIG. 4, but any number could be used, as desired or necessary. Alternatively, both forms of adhesive securing means could be provided in combination, if desired. As depicted in FIG. 9, the strips of adhesive tape preferably have a protective peel-away strip 21 applied to the adhesive side to prevent the strips of tape from adhering to objects until ready for use. In use, the shield is positioned on the rim of the toilet bowl, the peel-away strips are removed, and the strips of tape pulled downwardly and pressed against the outside of the toilet bowl to secure the shield in place.

The domed shape of the shield provides clearance beneath the shield to accommodate displacement of water during use of the plunger, and the gripping means 14 with its outwardly turned bead 15 on its upper end enables a user to grip the bead to pull the shield from the plunger handle following use. The transparency of the shield enables a user to observe progress during use of the plunger, and the use of biodegradable material in its construction enables environmentally friendly disposal of the shield following use.

Figure 10:
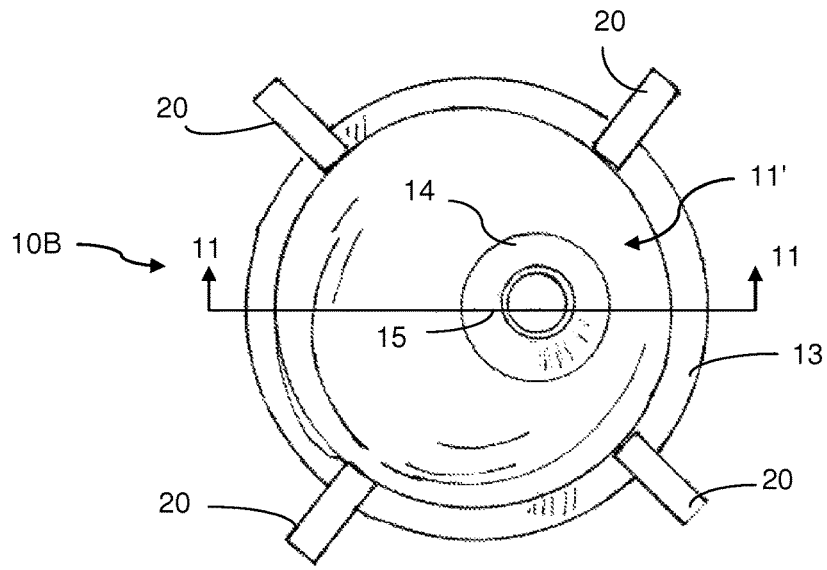
FIG. 10 is a top plan view of an alternate embodiment of splash shield according to the invention wherein the shield has a round configuration for use on a round toilet bowl, and wherein strips of adhesive tape are used to secure the shield in place.
Figure 11:
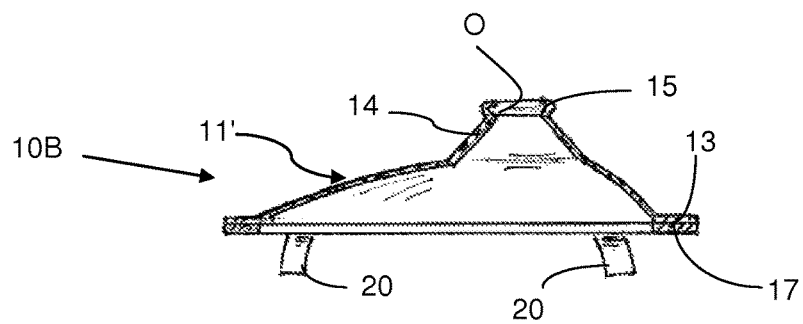
FIG. 11 is a sectional view taken along line 11-11 in FIG. 10.

An alternate preferred embodiment 10B is shown in FIGS. 10 and 11, wherein the shield 11' is round rather than elongated as in the first form of the invention. In all other respects this form of the invention is the same as that previously described, and preferably has strips of adhesive tape 20 spaced around the periphery of the shield, and/or an adhesive applied to the underside of the gasket seal 17 to engage against the top surface of the rim of a toilet bowl.

Figure 12:
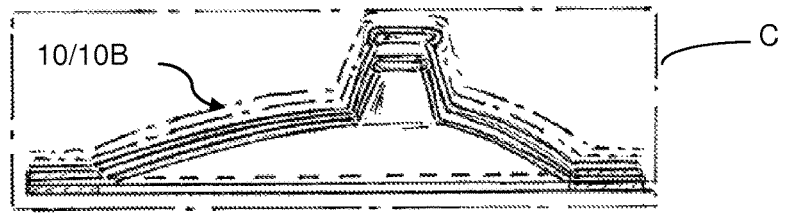
FIG. 12 is a sectional view showing a plurality of the shields of FIGS. 1-7 in stacked relationship, with dot-and-dash lines indicating a container in which the stacked shields may be packaged, it being understood that a like stacking relationship exists for that form of the invention shown in FIGS. 10-11.

As depicted in FIG. 12, a plurality of one of the embodiments of shields shown in FIGS. 1-11 are nestable with one another so that a desired number of shields, e.g. 3 to 5, may be compactly stacked together for storage and/or packaging in a container C, indicated by dot-and-dash lines.

Figure 13:
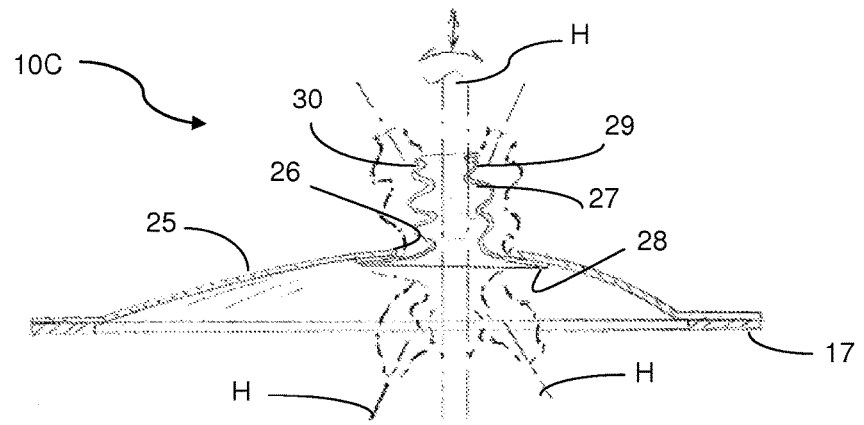
FIG. 13 is a sectional view of an alternate embodiment wherein a bellows-folded flexible membrane is secured at one end in the opening through the domed shield and engaged at its other end with the plunger handle.

A further preferred embodiment 10C is shown in FIG. 13, wherein the top of the dome shaped shield body 25 has an enlarged opening 26 formed through it and a flexible accordion-pleated membrane 27 is secured in the opening and extends upwardly through the opening to form the upstanding projection. A bottom end 28 of the membrane is radially enlarged and glued or otherwise suitably secured to the underside of the shield body around the opening 26, and the top end 29 is positioned in close fitting relationship around the plunger handle. An outwardly projecting annular bead 30 is formed around the top end, and the membrane and bead form a gripping means that is gripped to pull the shield from a plunger handle following use. Further, during use of this form of the invention the membrane permits substantial movement of the plunger in multiple directions relative to the shield, as depicted by the broken lines, without imparting any force on the shield. The membrane may be transparent, translucent, or opaque, and has a thickness and flexibility similar to that of a plastic grocery bag and preferably is formed of a biodegradable material. In all other respects this form of the invention is identical to the previous embodiments, including the use of a gasket seal 17 and adhesive means such as the strips of tape 20 and/or adhesive on the underside of the gasket seal to secure the shield to a toilet bowl.

Figure 14:
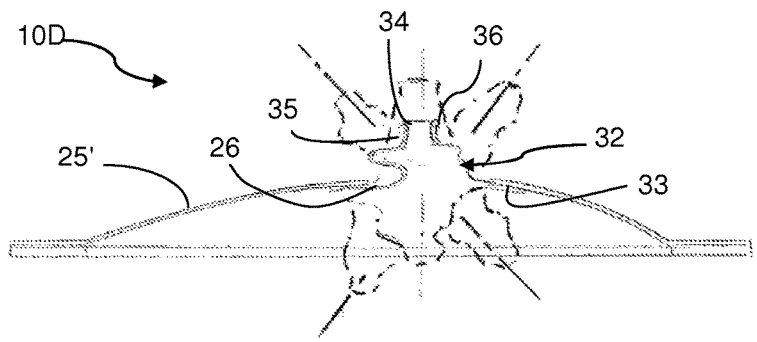
FIG. 14 is a sectional view of a further embodiment wherein the flexible membrane comprises a sheet secured at an outer edge in the opening through the domed shield and engaged at its inner edge with the plunger handle.
Figure 14A:
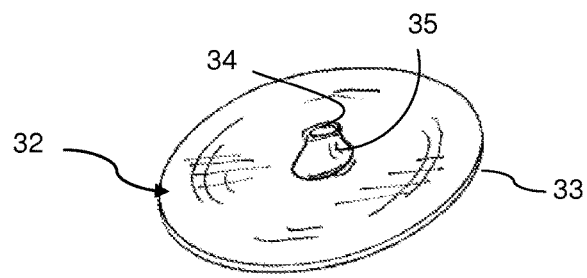
FIG. 14A is a top perspective view of the membrane of FIG. 14, shown removed from the shield body.

A still further preferred embodiment is indicated generally at 10D in FIGS. 14 and 14A. In this embodiment the top of the dome shaped shield body 25' has an enlarged opening 26 formed through it as in the FIG. 13 embodiment, but instead of an accordion-pleated membrane as in the previous embodiment, the membrane comprises a sheet 32 of flexible material having an outer edge 33 glued or otherwise suitably secured to the underside of the shield body around the opening 26, and an inner edge 34 positioned in close fitting relationship around the plunger handle. The inner edge is formed as a short upstanding conical projection 35 with an annular bead 36 at its upper end. The projection and bead form a gripping means to facilitate removal of the shield form the handle of a plunger following use. The width of the membrane between its inner and outer edges is substantially greater than the distance between the edge of the opening 26 and the handle, whereby the membrane has excess material between its outer edge fixed to the shield body and its inner edge engaged with the plunger handle, enabling substantial movement of the plunger handle in multiple directions relative to the shield without such movement exerting any force on the shield.

Figure 15:
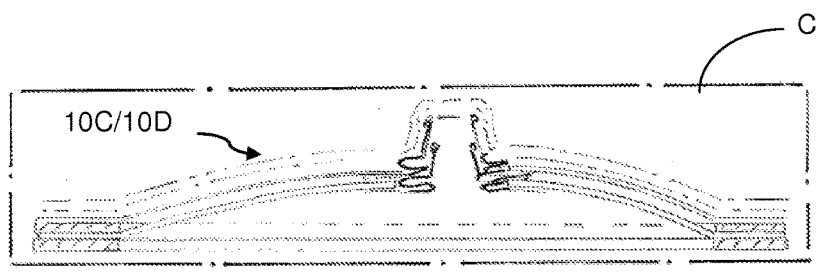
FIG. 15 is a sectional view showing a plurality of the shield of either FIG. 13 or 14 in stacked relationship with one another, with dot-and-dash lines indicating a container in which the stacked shields may be packaged.

FIG. 15 depicts a plurality of shields according to either the FIG. 13 or FIG. 14 embodiment disposed in nested relationship. The close-fitting nested relationship of the shields enables a plurality of them to be compactly stacked for storage and/or packaging in a container C, indicated by dot-and-dash lines.

Figure 16:
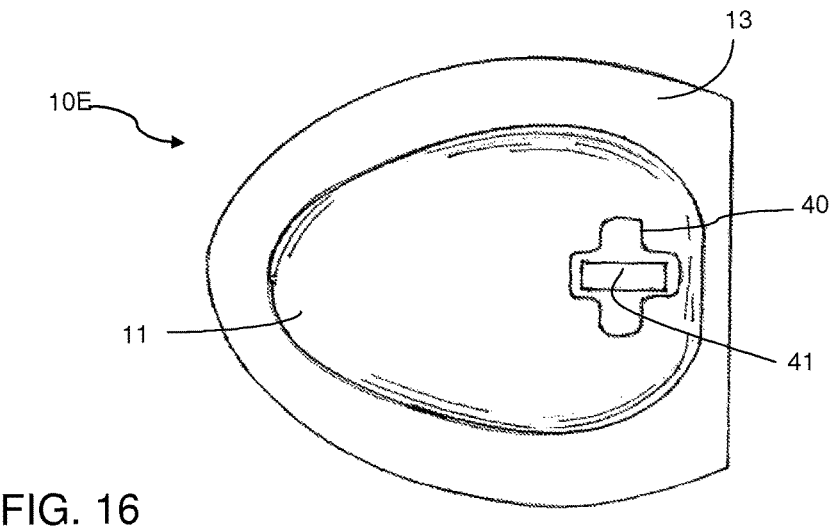
FIG. 16 is a top plan view of a preferred embodiment wherein the upstanding projection is generally X-shaped in plan view and the opening is an elongate slot extending fore and aft.
Figure 17:
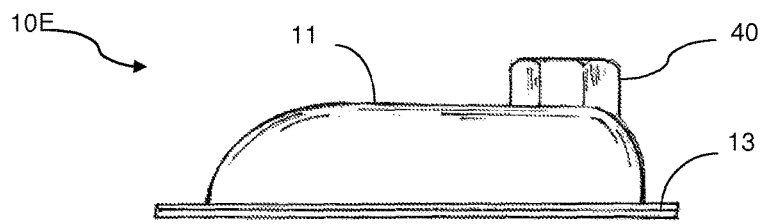
FIG. 17 is a side view in elevation of that form of the invention shown in FIG. 16.

Another preferred embodiment of the invention is shown at 10E in FIGS. 16 and 17. In this form of the invention the upstanding projection 40 on top of the dome 11 is generally X-shaped in plan view and the opening for receiving the plunger handle comprises an elongate slot 41 formed in its upper end, extending longitudinally or fore and aft of the shield. The plunger handle extends through this slot and the shape of the slot enables the plunger handle to be tilted fore and aft during use. The projection is sufficiently stiff that it forms a handle that can be grasped to manipulate the shield when placing it on a plunger or pulling it from a plunger handle following use.

Figure 18:
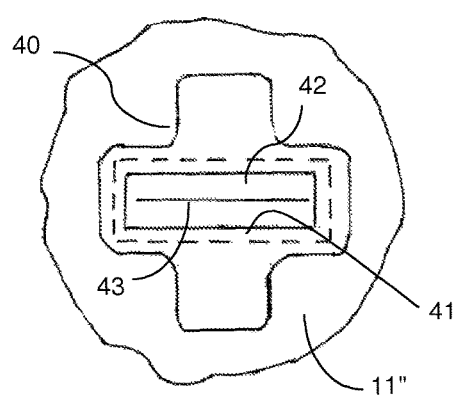
FIG. 18 is a fragmentary view looking down on the upwardly projecting X-shaped projection, wherein a seal is secured over the slot, with a slit to accommodate the plunger handle.

FIG. 18 depicts an embodiment wherein a strip of material 42 is secured beneath the slot 41 and a slit 43 is formed in the strip to enable the plunger handle to slide relative to the strip. The strip forms a seal to prevent water and other material from splashing out through the slot during use.

Figure 19:
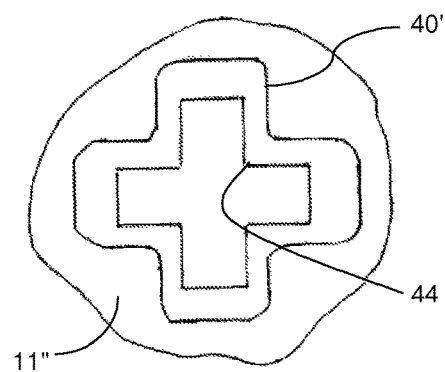
FIG. 19 is a fragmentary view looking down on the upwardly extending X-shaped projection, wherein slots extend both fore and aft and side-to-side.

An alternate embodiment is shown in FIG. 19 wherein the opening for receiving the plunger handle comprises a generally X-shaped slot 44 in the top end of the projection, with arms of the slot extending both fore and aft and side-to-side, thereby providing space for tilting movement of the plunger handle in both the fore and aft and side-to-side directions.

Figure 20:
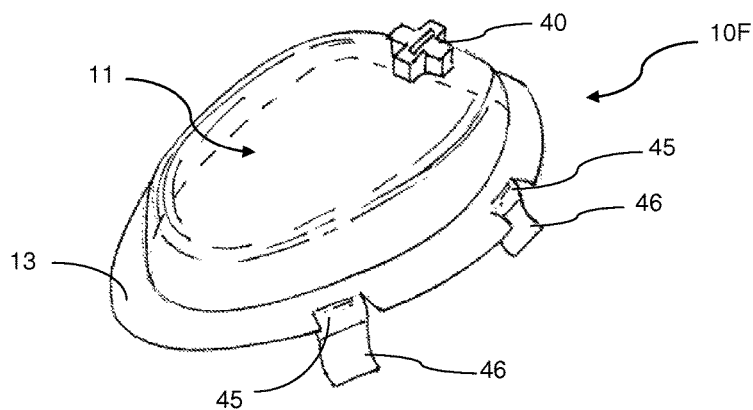
FIG. 20 is a view looking at a slight angle from above, wherein a plurality of bendable tabs are spaced around the annular flange, with strips of tape affixed to the tabs so that the tabs may be folded downwardly and the strips of tape releasably attached to the outer surface of the toilet bowl.

A preferred embodiment is shown at 10F in FIG. 20, wherein bendable tabs 45 are formed in the flange 13 and strips of tape 46 are attached to the tabs so that when the shield is placed on the rim of a toilet bowl the tabs can be bent downwardly and the tape adhered to the upper outer surface of the toilet bowl without deforming the flange.

Figure 21:
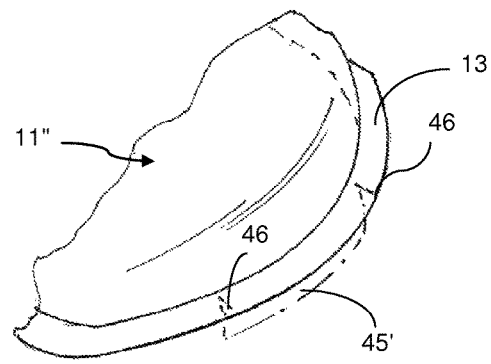
FIG. 21 is a fragmentary view of one side portion of the shield, looking at a slight angle from above, wherein a single elongate bendable tab is on each of the opposite sides of the annular flange (only one of which is shown), and elongate strips of tape are affixed to the tabs so that the tabs may be folded downwardly and the strips of tape releasably attached to the outer surface of the toilet bowl.

FIG. 21 shows a variation of the embodiment in FIG. 20, wherein an elongate bendable tab 45' is defined by spaced perforated weakened lines 46 in the flange 13 on each of the opposite sides of the shield (only one tab is shown, it being understood that the identical structure exists on the opposite side of the shield) and associated strips of tape (not shown) are provided on the tabs to secure the shield in place during use. Defining the tab between frangible perforated lines enables only as much of the tab to be bent downwardly as necessary to accommodate rims having different dimensions.

Figure 22:
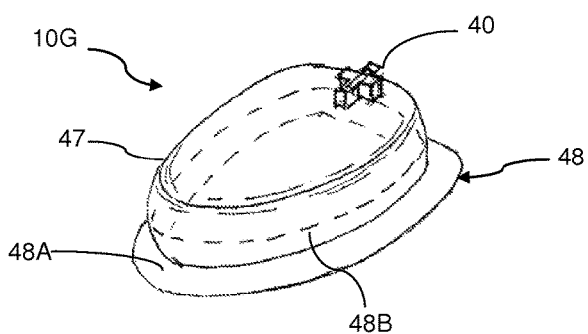
FIG. 22 is a perspective view of an alternate embodiment wherein only the dome of the shield is made of a plastic material, and a separate piece of paperboard is secured to the bottom edge of the dome to form the flange and seal.
Figure 23:
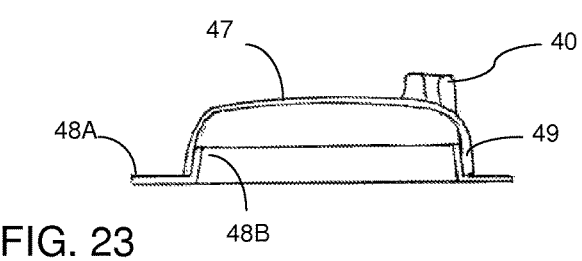
FIG. 23 is a longitudinal sectional view of the shield shown in FIG. 22.

A further embodiment is shown at 10G in FIGS. 22 and 23, wherein only the dome 47 of the shield is formed of a transparent plastic material. A single separate piece 48 of thin corrugated cardboard forms the flange 48A and seal. A narrow upstanding annular wall 48B on the inner marginal edge of the flange 48A extends upwardly inside the dome 47 and is affixed to its lower inner marginal edge 49.

Figure 24:
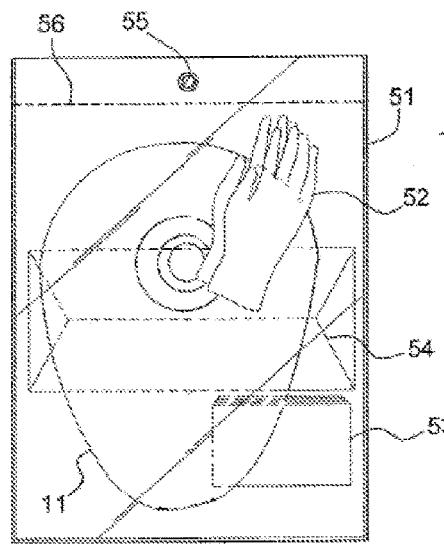
FIG. 24 is a plan view of a kit according to the invention, wherein a splash shield, gloves, paper towels, and a flattened box are packaged in an envelope-like bag.

A kit incorporating one or more disposable splash shields according to any of the forms of the invention disclosed herein is shown at 50 in FIG. 24. The kit comprises container 51 in which are packaged one or more shields (a shield 11 is depicted in the drawing), a pair of latex or nitrile rubber gloves 52, one or more paper towels 53, and a small flattened or collapsed cardboard box 54. As shown in this figure, the container comprises an envelope-like bag preferably having an eyelet 55 in one end and a frangible tear line 56 to enable the bag to be opened to gain access to the contents. Alternatively, the container could comprise a box as depicted somewhat schematically in FIGS. 12 and 15.

Figure 25:
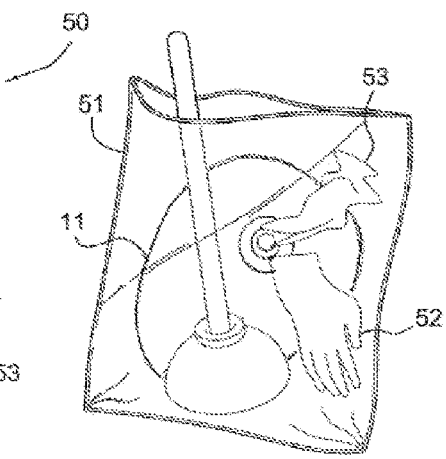
FIG. 25 depicts the bag of FIG. 16 being used to dispose of a used shield, towels and gloves, and also showing it being used to carry a plunger to be cleaned or for disposal.
Figure 26:
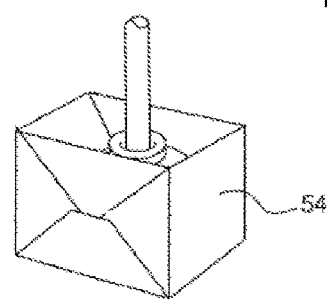
FIG. 26 is a top perspective view showing the box from the package of FIG. 16 in an expanded or opened up condition and being used to carry a used plunger to a location to be cleaned.

After the shield has been used, the shield, gloves, and used paper towels may be returned to the container 51 for disposal, as depicted in FIG. 25. If a disposable plunger has been used it may also be placed in the bag as shown. If the plunger is not to be disposed of, the box 54 can be opened up and the plunger placed in the box as depicted in FIG. 26 so that the plunger can be carried to a location to be cleaned without dripping soiled water onto the floor.

Figure 27:
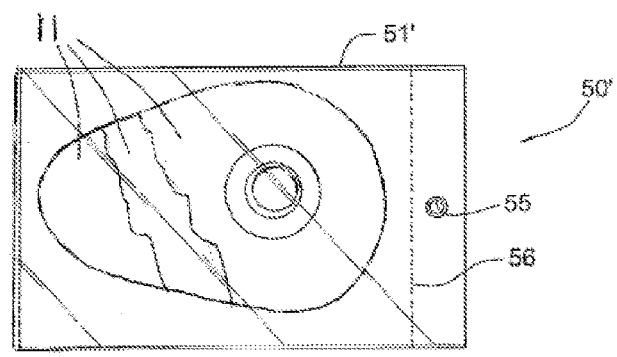
FIG. 27 is a plan view of an embodiment wherein a plurality of splash shields is packaged in an envelope.

FIG. 27 shows an embodiment 50' wherein one or more splash shields according to any of the various embodiments disclosed herein may be packaged in a container 51' (a plurality of stacked shields 11 are shown in this figure), without gloves or other accessories provided in the package. Any number of shields may be included, but 5-10 are contemplated. Further, the full kit shown in FIG. 16 may include a plurality of splash shields, if desired.

The invention is usable with any type of plunger, and may be adapted to any shape and size of toilet. Although transparent plastic has been disclosed as the preferred material, it should be understood that other materials could be used as long as they are suitable for the intended purpose. The kit may include a disposable plunger or sold without a plunger included, as desired.

Although particular embodiments of the invention are illustrated and described in detail herein, it is to be understood that various changes and modifications may be made to the invention without departing from the spirit and intent of the invention as defined by the scope of the appended claims.

What is claimed is:

1. A disposable splash shield for preventing splashing of water out of a toilet when a plunger is being used to unclog the toilet, said shield comprising:
    a shallow dome shaped shield body having a diameter, a top end and a bottom end, said shield body being transparent to enable a user to view through the shield and into the toilet bowl when the shield is operatively positioned on a toilet bowl;
    the distance between the top end and the bottom end being substantially less than the diameter of said shield body
    a radially outwardly extending annular flange on said bottom end, said flange having a bottom surface adapted to fit on an upper surface of a toilet bowl rim when the shield is in use;
    seal means on the bottom surface of said flange for effecting a seal between said shield and said toilet bowl rim;
    an upstanding frustoconically shaped projection on said top end of said shield body, said projection having an opening therethrough for receiving a plunger handle, said projection and opening being positioned in said shield body so that they are in substantial alignment with a drain opening from the toilet bowl and on the side of said shield body remote from the toilet bowl when the splash shield is in use and is correctly positioned on the rim of a toilet bowl;
    said projection having an external raised annular bead on its upper end forming a gripping means that is gripped with a user's fingers to pull said shield from a plunger handle following use; and
    adhesive means carried by said shield for releasably securing said shield in place on a toilet bowl.

2. The disposable splash shield as claimed in claim 1, wherein:
said shield body is foldable in half about a transverse fold line for compact storage and shipment.

3. The disposable splash shield as claimed in claim 1, wherein:
said shield body has an opening through its top end; and
said projection comprises a flexible membrane formed separately from said shield body and having an outer edge secured to said shield body around said opening in the top end of the shield body, and an inner edge adapted to be disposed in close fitting relationship to the handle of a plunger when in use.

4. The disposable splash shield as claimed in claim 3, wherein:
said flexible membrane is accordion-pleated.

5. The disposable splash shield as claimed in claim 3, wherein:
said flexible membrane comprises a flat sheet having a width between said inner and outer edges that is greater than the distance from an edge of said opening through said shield body to a plunger handle extended through the membrane; and
said projection comprises an upstanding conical projection at a central portion of said membrane.

6. The disposable splash shield as claimed in claim 3, wherein:
said adhesive means comprises a plurality of strips of adhesive tape adhered at one end to said annular flange for adhesive attachment at an opposite end to an adjacent upper outer surface portion of a toilet bowl.

7. The disposable splash shield as claimed in claim 6, wherein:
said shield body is foldable about a transverse fold line to make it more compact for storage and shipping.

8. The disposable splash shield as claimed in claim 7, wherein:
said shield is part of a kit that includes said shield body, a pair of latex or nitrile rubber gloves, at least one paper towel, and an envelope-like bag, said shield body, said gloves, and said at least one paper towel being packaged in said envelope-like bag for display and sale, and said bag comprising a container for receiving and disposing of said shield body, said gloves, and said at least one paper towel following use thereof.

9. The disposable splash shield as claimed in claim 7, wherein:
a plurality of shields are packaged together in a container for display and sale.

10. The disposable splash shield as claimed in claim 1, wherein:
said shield body is made of a biodegradable plastic material.

11. The disposable splash shield as claimed in claim 1, wherein:
said adhesive means comprises an adhesive band on an underside of said annular flange.

12. The disposable splash shield as claimed in claim 11, wherein:
a strip of peel-away material is applied to said adhesive band to prevent it from adhering to something until it is desired to use the shield.

13. The disposable splash shield as claimed in claim 1, wherein:
said adhesive means comprises a plurality of strips of adhesive tape adhered at one end to said annular flange for adhesive attachment at an opposite end to an adjacent upper outer surface portion of a toilet bowl.

14. The disposable splash shield as claimed in claim 13, wherein:
a strip of peel-away material is applied to said strips of adhesive tape to prevent them from adhering to something until it is desired to use the shield.

15. The disposable splash shield as claimed in claim 1, wherein:
said shield is configured so that the shield can be nested with like shields to enable a plurality of said shields to be stacked together for compact packaging and storage.

16. The disposable splash shield as claimed in claim 1, wherein:
said projection is generally X-shaped in plan view; and
said opening through said projection comprises an elongate slot extending fore and aft of said shield body.

17. The disposable splash shield as claimed in claim 16, wherein:
a strip of material is secured across said slot to seal it and prevent splashing of material through said slot during use of the shield, said strip of material having a slit in it for receiving the handle of a plunger.

18. The disposable splash shield as claimed in claim 1, wherein:
said projection is generally X-shaped in plan view; and
said opening through said projection comprises a generally X-shaped slot extending fore and aft and side-to-side of said shield body.

* * * * *